United States Patent
Frederick

(10) Patent No.: US 8,446,277 B2
(45) Date of Patent: May 21, 2013

(54) PROXIMITY WARNING SYSTEM WITH SILENT ZONES

(75) Inventor: Larry D. Frederick, Huntsville, AL (US)

(73) Assignee: Strata Proximity Systems, LLC, Sandy Springs, GA (US)

( * ) Notice: Subject to any disclaimer, the term of this patent is extended or adjusted under 35 U.S.C. 154(b) by 408 days.

(21) Appl. No.: 12/770,287

(22) Filed: Apr. 29, 2010

(65) Prior Publication Data
US 2010/0271214 A1  Oct. 28, 2010

Related U.S. Application Data

(63) Continuation-in-part of application No. 11/984,824, filed on Nov. 21, 2007, now Pat. No. 8,232,888.

(60) Provisional application No. 61/174,444, filed on Apr. 30, 2009, provisional application No. 60/996,034, filed on Oct. 25, 2007.

(51) Int. Cl.
*G08B 1/08* (2006.01)
*G08B 13/24* (2006.01)

(52) U.S. Cl.
USPC ............ 340/539.23; 340/539.21; 340/539.22; 340/551

(58) Field of Classification Search
USPC .............. 340/539.1, 539.11, 539.13, 539.21, 340/539.22, 539.23, 540, 541, 551, 552, 340/553, 554, 562, 573.1, 686.1; 324/207.12, 324/228, 239, 243, 713
See application file for complete search history.

(56) References Cited

U.S. PATENT DOCUMENTS

| | | | |
|---|---|---|---|
| 2,957,115 A | 10/1960 | Clark et al. | |
| 3,064,257 A | 11/1962 | Guest | |
| 4,818,855 A | 4/1989 | Mongeon et al. | |
| 4,965,909 A | 10/1990 | McCullough et al. | |
| 5,025,175 A | 6/1991 | Dubois, III | |
| 5,315,289 A | 5/1994 | Fuller et al. | |
| 5,477,210 A | 12/1995 | Belcher | |
| 5,767,669 A | 6/1998 | Hansen et al. | |
| 5,892,447 A | 4/1999 | Wilkinson | |
| 5,939,986 A | 8/1999 | Schiffbauer et al. | |
| 5,942,975 A * | 8/1999 | Sørensen | 340/562 |
| 6,150,956 A | 11/2000 | Laufer | |
| 6,170,607 B1 | 1/2001 | Freeman et al. | |

(Continued)

FOREIGN PATENT DOCUMENTS

| CN | 87 2 00771 U | 1/1988 |
|---|---|---|
| CN | 1444009 A | 9/2003 |

(Continued)

*Primary Examiner* — Van T. Trieu
(74) *Attorney, Agent, or Firm* — Dickstein Shapiro LLP

(57) ABSTRACT

Various proximity detection zones for work sites that require personnel to be in close proximity to various hazardous elements, such as machines, mobile equipment, remotely controlled machines, and operated vehicles can be shaped to fit specific equipment or work area configurations and may include one or more silent zones within the proximity warning zone in which an alarm is not sounded. The zones are determined by overlapping magnetic fields that expand and collapse at a selected operating frequency. Devices sense and measure the strength of the magnetic fields in which they are located and use the information to determine if they are in a silent or warning zone. Thus, it is possible to produce silent zones having desired shapes.

35 Claims, 4 Drawing Sheets

U.S. PATENT DOCUMENTS

| | | | |
|---|---|---|---|
| 6,288,651 | B1 | 9/2001 | Souza |
| 6,614,387 | B1 | 9/2003 | Deadman |
| 6,686,881 | B1 | 2/2004 | Lu et al. |
| 6,724,191 | B1 | 4/2004 | Larsen |
| 6,784,800 | B2 | 8/2004 | Orzechowski |
| 6,810,353 | B2 | 10/2004 | Schiffbauer |
| 6,963,278 | B2 | 11/2005 | Frame |
| 7,015,812 | B1 | 3/2006 | Lemchen |
| 7,095,336 | B2 | 8/2006 | Rodgers et al. |
| 7,148,791 | B2 | 12/2006 | Grisham et al. |
| 7,420,471 | B2 | 9/2008 | Frederick et al. |
| 7,915,887 | B2 * | 3/2011 | Englert et al. ........... 324/207.16 |
| 2002/0082803 | A1 | 6/2002 | Schiffbauer |
| 2003/0137421 | A1 | 7/2003 | Herkenrath et al. |
| 2003/0227268 | A1 | 12/2003 | Smith |
| 2004/0113774 | A1 | 6/2004 | Wilson |
| 2006/0087443 | A1 | 4/2006 | Frederick et al. |
| 2006/0180094 | A1 | 8/2006 | Viggiano |
| 2007/0001803 | A1 | 1/2007 | Plamoottil |
| 2007/0296565 | A1 | 12/2007 | Himmel |

FOREIGN PATENT DOCUMENTS

| | | |
|---|---|---|
| CN | 201226014 Y | 4/2009 |
| WO | WO-2004/090830 A1 | 10/2004 |
| ZA | 893125 | 12/1989 |
| ZA | 98/11447 | 7/1999 |
| ZA | 984073 | 11/1999 |
| ZA | 98/11449 | 6/2000 |
| ZA | 2000/4689 | 5/2001 |
| ZA | 2000/5675 | 7/2001 |
| ZA | 2006/03514 | 2/2005 |
| ZA | 2005/08120 | 1/2007 |

* cited by examiner

PROXIMITY WARNING SYSTEM WITH SILENT ZONES

CROSS-REFERENCE TO RELATED APPLICATIONS

This application claims the benefit of U.S. provisional application 61/174,444,filed on Apr. 30, 2009, and is a continuation-in-part and claims the benefit of U.S. application Ser. No. 11/984,824 , filed on Nov. 21, 2007, now U.S. Patent No. 8,232,888, issued Jul. 31, 2012, which claims the benefit of U.S. provisional application 60/996,034, filed on Oct. 25, 2007, the subject matters of which are incorporated in their entireties by reference herein.

BACKGROUND

This disclosure relates generally to proximity warning systems at work sites, and in particular to an interactive magnetic marker field and proximity warning system. Many methods have been devised to warn people against being struck, pinched, crushed or otherwise harmed by vehicles and mobile equipment. Such vehicles and mobile equipment may be used for above and below ground operations. Examples of the equipment include: road construction equipment such as trucks, road graders, rollers and pavers; surface mining equipment, such as for use with gravel and sand operations, front end loaders, trucks, dozers, conveyors and other items; underground mining equipment such as continuous miners, shuttle cars, conveyors, crushers, load-haul-dump vehicles, man-trips, tractors, and other items. The equipment also includes forklifts, cranes, and trucks used at warehouses and shipping ports.

Many people have been killed in the U.S. by such equipment. Unfortunately, the systems that have been devised to help protect people and property in these industrial operations, such as proximity warning and collision avoidance systems, have usually not been very effective. A new proximity warning system was developed and successfully demonstrated for use on continuous miners, as disclosed in U.S. Pat. No. 7,420,471. An objective of the '471 patent is to help prevent the crushing or pinning of personnel who are remotely controlling a continuous miner, and to help protect other personnel assisting in use of the continuous miners. The '471 patent also envisions to provide protection to personnel from other types of mobile equipment and machines. The system of the '471 patent employs a magnetic marker field and an active architecture that incorporates two-way communication between the worker and the machine the worker is near. Warnings are given to workers that are too close to the miner. Warnings are also provided to the operator of the machine. Provisions are made to immobilize the equipment until personnel were able to reach a safer position.

The magnetic fields used in the '471 patent system oscillate at low frequencies and can be effectively used to mark off silent zones. Although the maximum practical range of such low frequency magnetic fields may be less than 50 feet in most applications, which is more than is needed or desirable for most equipments. Typical haul trucks would probably be best served with a warning zone in the range of 20-30 feet and a danger zone in the range of 10-15 feet. In some applications, such as remotely controlled continuous miners, it is necessary for the operator to remain within a range of 10-25 feet much of the time in order to maintain good visual contact with the machine and the immediate surroundings. In underground mines, the low frequency magnetic fields pass through earth formations unimpeded so that a worker that is around a corner, not in line of sight, or otherwise obstructed, will still be visible to the marker field. These magnetic fields do not radiate from antennas but simply expand and contract around the element that produces them, and are well suited for marking boundaries between silent zones and warning zones.

There are situations where it is desirable for workers to be close to one part of the equipment but not close to another part of the equipment. An example is a truck that is backing up. A worker at the side of the truck may be at a very low risk or possibly no risk at all; yet, a worker behind the truck may be at a very high risk. Magnetic fields that extend far enough behind the truck to provide the needed protection, however, will generally also produce a larger than desired field to the sides of the truck. Therefore, there is a need to be able to shape a marker field to define areas where workers need to be positioned, and/or areas that present acceptable or lowered safety risks.

SUMMARY

Work environments to which the various embodiments described herein are applicable are very diverse. One of these environments, a road construction environment, may be used as a basis for better explaining various embodiments described herein. Some workers at a road construction site may be, for a time, working around a particular machine and then move to a different machine or continue to work when another machine arrives. Some workers may frequently move through a space between machines. In addition to the workers around the vehicle, operators may be riding upon the vehicle, and may also switch from operating one vehicle to another vehicle. Other machines may be remotely controlled by the operators. A robust proximity warning system should be able to reliably help to keep workers and operators from being in dangerous situations while coping with operational variables, and do so without significant false alarms.

One embodiment described herein provides a proximity warning system comprising a generator that generates a magnetic field that establishes a boundary, where the generator is capable of receiving radio frequency signals. Also provided is a radio frequency device that sends radio frequency signals, the radio frequency device being capable of sensing the magnetic field and generating a radio frequency response. In the proximity warning system, the generator generates the magnetic field for a first predefined time period, and thereafter senses for a radio frequency response signal from the radio frequency device within a second predefined time period. The proximity warning system also includes a second generator that generates a second magnetic field for a third predefined time period. The second generator senses for a radio frequency response within a fourth predefined time period.

Another embodiment described herein provides a proximity warning system for generating a shaped silent zone. The proximity warning system comprises a first generator that generates a first magnetic field having a first boundary, and a second generator that generates a second magnetic field having a second boundary. Overlaying the first and second boundaries produces a different boundary, and the first and second magnetic fields are generated in sequence.

Another embodiment described herein provides a method for providing a proximity warning including generating a first magnetic field, generating a second magnetic field that overlaps the first magnetic field, determining a location of a detector device with respect to the first and second magnetic fields, wherein the location is determined by detecting at least one of the first or second magnetic fields using the detector device, and issuing a warning based on the location of the detector device.

In some embodiments the warning is issued if the detector device is located within both the first and second magnetic fields and in other embodiments no warning is issued if the detector device is located within both the first and second magnetic fields. Further, the warning may be issued if the detector device is located only within the first magnetic field or no warning may be issued if the detector device is not located within the first or second magnetic fields. Additionally, the second magnetic field may be located completely within the first magnetic field.

The method may further comprise generating a third magnetic field that overlaps the first magnetic field, wherein the location of the detector device is determined with respect to the first, second and third magnetic fields by detecting the first, second and third magnetic fields using the detector device.

In the above method the warning may be issued to a worker who is carrying the detector device or to a machine that houses a magnetic field generator for generating the first and/or second magnetic fields, wherein the machine may automatically perform certain actions upon receiving the warning. Also the warning may be issued to an operator of the machine.

Another embodiment described herein provides a proximity warning system including a first generator that generates a first magnetic field, a second generator that generates a second magnetic field that overlaps the first magnetic field, a detector device that measures the strength of the first and second magnetic fields and determines its location with respect to the first and second magnetic fields, and an alarm device that issues a warning based on the location of the detector device. Also, the alarm device may issues the warning if the detector device is located within both the first and second magnetic fields.

In another embodiment, the alarm device may not issue the warning if the detector device is located within both the first and second magnetic fields or the alarm device may issue the warning if the detector device is located only within the first magnetic field. Alternatively, the alarm device may not issue the warning if the detector device is not located within the first or second magnetic fields.

In a further embodiment, the second magnetic field is located completely within the first magnetic field and the system further comprises a third generator that generates a third magnetic field that overlaps the first magnetic field. In this embodiment, the detector device measures the strength of the first, second, and third magnetic fields and determines its location with respect to the first, second, and third fields. Also, the detector device and the alarm device may both be located in a single device.

In another embodiment the warning may be issued to a worker or to a machine that houses the first and second generators or to an operator of the machine.

The above and other advantages and features of the embodiments described herein will be more clearly understood from the following detailed description which is provided in connection with the accompanying drawings.

DETAILED DESCRIPTION OF PREFERRED EMBODIMENTS

The various embodiments described herein are particularly applicable to work sites that require personnel to be in close proximity to various hazardous elements, such as machines, mobile equipment, remotely controlled machines, and operated vehicles. Such work environments may include locations that are inherently dangerous and should be avoided or entered only with great caution. Examples of such work environments are surface mining, underground mining, sand and gravel operations, road construction, warehouses, shipping docks, coke plants, etc. Workers are sometimes struck, pinched, crushed or otherwise harmed while performing their jobs in such environments. Collisions between the various elements at the work sites need to be avoided also to avert property damage.

As disclosed herein, various protection zones can be shaped to fit specific equipment or work area configurations and may include one or more silent zones within the protection zone in which an alarm is not sounded. Thus, it is possible to produce silent zones having desired shapes.

Figure 1:
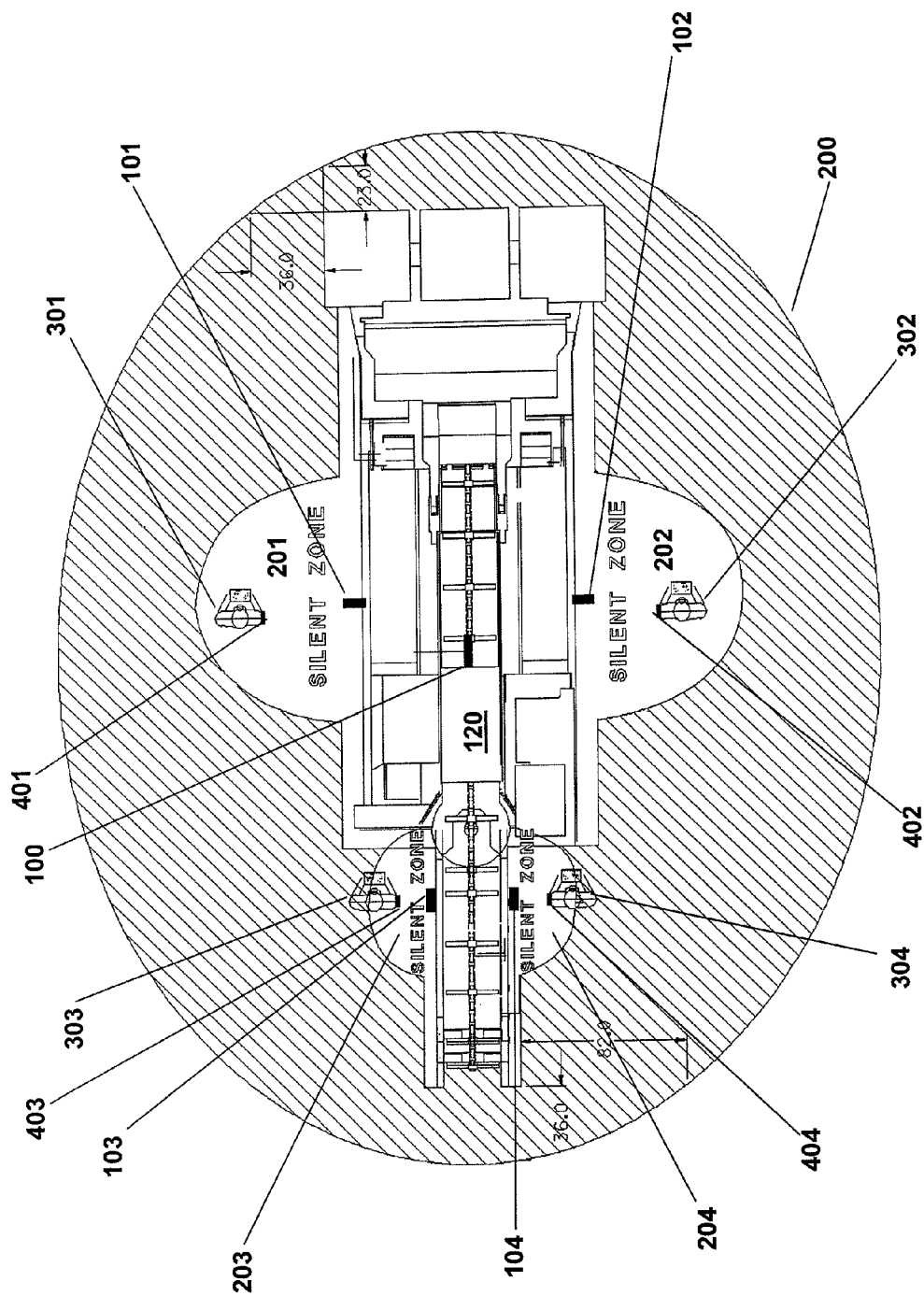
FIG. 1 shows a proximity warning system mounted on a piece of equipment in which the proximity warning system has multiple silent zones.

Referring now to FIG. 1, there is illustrated a simplified example of a work site where an embodiment is implemented. FIG. 1 shows a proximity warning system including five magnetic field generators 100, 101, 102, 103, 104 mounted on a vehicle 104, for example, a continuous miner. The proximity warning system also includes four personal alarm devices (PADS) 401, 402, 403, 404 carried by four workers 301, 302, 303, 304. The magnetic field generators and PADS are essential elements of a proximity warning system using a PING/ECHO system and are described in greater detail in U.S. patent application Ser. No. 11/984,824, which is incorporated herein by reference in its entirety.

Figure 2:
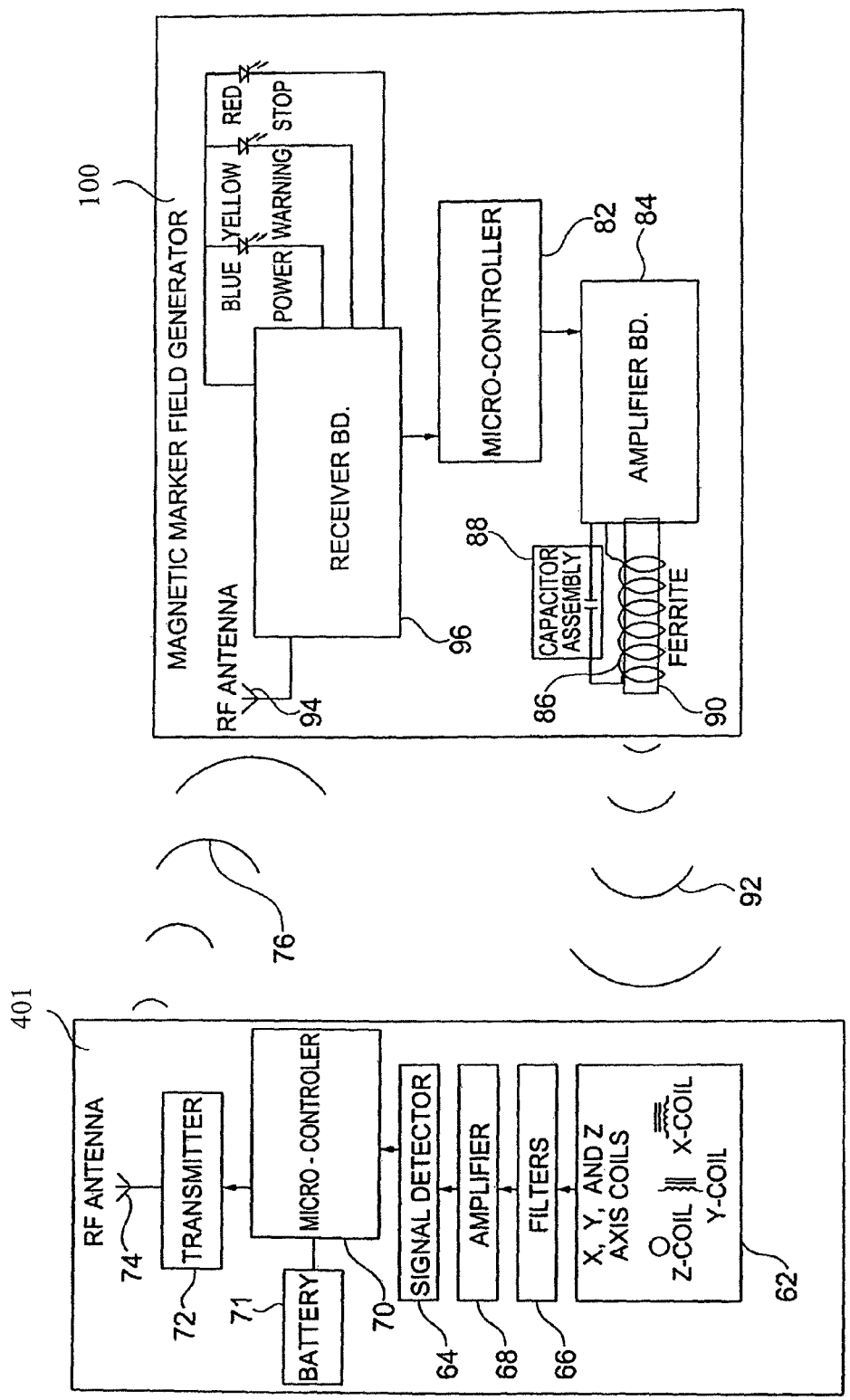
FIG. 2 shows an exemplary magnetic field generator and personal alarm device.

FIG. 2 shows an exemplary magnetic field generator, for example, the magnetic field generator 100. Magnetic field generator 100 has a microcontroller 82, which produces low frequency oscillations that are amplified by the amplifier 84. The low frequency oscillations produce a low frequency oscillating current through a winding 86 around the ferrite 90. A capacitor assembly 88 is connected in series with the winding 86 to produce the oscillating magnetic field. The values of capacitor(s) in the capacitor assembly 88 are selected to produce a series resonant circuit at the operating frequency of the PING/ECHO system. A typical circuit would include an inductance value of approximately 300 microHenries with a capacitance of approximately 163 microfarads, for example. This embodiment's use of a series resonant circuit produces a higher current through the winding 86 with less driving voltage.

The magnetic field generators 100 generate magnetic fields 200 and expands and collapses at a selected operating frequency. An operation frequency of approximately 73 kHz has been found to be a suitable choice, for example. Having knowledge of the teachings disclosed herein, persons knowledgeable in magnetics, tuned circuits and the intended applications can select the operating frequency and the circuit elements to fit the specific applications. For example, the operating frequency might be reduced to 25 kHz if the inductance to capacitance ratio and the voltage used to drive the circuit do not result in a rise time greater than desired for the system response that is required. Higher frequencies above about 100 kHz should be avoided in underground mining since they tend to propagate on cables and pipes, or via other metallic objects.

FIG. 2 also shows an exemplary personal alarm device "PAD", for example, the PAD 401 that is capable of sensing and measuring a magnetic field. The PAD 401 has three orthogonal coils 62 that sense the marker field 92, and in turn pass the sensed signal/information into a detection circuit 64, via filters 66 and amplifier 68. A microcontroller 70 measures the strength of the signals, and has a battery 71. The microcontroller 70 turns on the RF transmitter 72 to send, through antenna 74, a return signal 76 (an "ECHO") to the receiver antenna 94 in the generator 100. The ECHO signal 76 then passes to the magnetic field generator receiver 96, which registers the presence of an ECHO and sends an appropriate response/information to the microcontroller 82.

Referring now to FIG. 1, the magnetic field generators 100, 101, 102, 103, 104 generate magnetic fields 200, 201, 202, 203, 204, respectively. The magnetic fields 200, 201, 202, 203, 204 expand and collapse at a selected operating frequency. The PADS 401, 402, 403, 404 sense and measure the strength of the magnetic fields 200, 201, 202, 203, 204 in which they are located. The size of the magnetic fields 200, 201, 202, 203, 204 can be adjusted by increasing or decreasing the power of the magnetic field generators 100, 101, 102, 103, 104. In addition, the effective size of the magnetic fields 200, 201, 202, 203, 204 can be adjusted by changing the magnetic field level at which the PAD 401, 402, 403, 404 determines it is within a magnetic field. For instance, by decreasing the magnetic field strength at which the PAD 401, 402, 403, 404 determines it is within the magnetic field 201, the effective size of the magnetic field 200, 201, 202, 203, 204 increases. By increasing the magnetic field strength at which the PAD 401, 402, 403, 404 determines it is within the magnetic field 200, 201, 202, 203, 204 the effective size of the magnetic field 200, 201, 202, 203, 204 decreases.

The PADS 401, 402, 403, 404 send a return signal, also known as an "ECHO", which are detected by the magnetic field generators 100, 101, 102, 103, 104. The magnetic field generator that detects the ECHO signal registers the presence of an ECHO and sends an appropriate response/information to a microcontroller (not show). In various embodiments, each magnetic filed generator 100, 101, 102, 103, 104 may include its own microcontroller or may share a common microcontroller.

In use, the microcontroller determines whether the ECHO has been received in response to the magnetic fields 200, 201, 202, 203, 204, also known as a "PING", generated by a particular magnetic field generators 100, 101, 102, 103, 104. The microcontroller also determines in which silent zones the ECHO-emitting PAD is located.

In the embodiment shown in FIG. 1, the magnetic field 200 generated by magnetic field generator 100 is the largest of the magnetic fields and encompasses each of the other magnetic fields 201, 202, 203, 204. Magnetic field 200 corresponds to a warning zone located around the equipment 120. If the microcontroller determines that a worker carrying a PAD has entered the magnetic field 200, audible and/or visible alarm signals are sent to an alarm system located near the vehicle operator and also to the affected worker. In various embodiments, the equipment 120 may be stopped, slowed, or its operation otherwise modified if a worker enters the magnetic field 200.

However, in various situations, it may be necessary or desirable for a worker 301, 302, 303, 304 to be within the magnetic field 200 in order to properly operate the equipment 120 or perform other tasks without receiving a warning from the PAD. A silent zone or warning zone may be created by logically choosing combinations of the presence or absence of single or multiple magnetic fields in a particular location. For example, a warning zone may be defined by the microcontroller as a location having only a first magnetic field while a silent zone may be defined as a location having overlapping first and second magnetic fields. As another example, a silent zone may be defined as a location having both a first and second magnetic field, but not a third magnetic field. Other combinations of present and for absent magnetic fields at a particular location may also be used to logically define a silent zone or a warning zone.

The magnetic fields 201, 202, 203, 204, generated by the magnetic field generators 101, 102, 103, 104, respectively, correspond to silent zones located at various positions on or around the equipment 120. Therefore, in one embodiment, the PAD 401, 402, 403, 404 carried by a worker 301, 302, 303, 304 sounds a warning if it detects only the magnetic field 200 generated by magnetic field generator 100. However, if the PAD 401, 402, 403, 404 detects both magnetic field 200 and any of the other magnetic fields 201, 202, 203, 204, the worker 301, 302, 303, 304 is not given a warning. Thus, for example, the worker 301 standing within magnetic fields 200 and 201 produced by magnetic field generators 100 and 101 receives no warning so long as the worker 301 remains within the magnetic field 201. Similarly, the workers 302, 303, 304 receive no warning so long as they remain within the magnetic fields 202, 203, 204 generated by the magnetic field generators 102, 103, 104, respectively. On the other hand, if worker 301 is no longer within the silent zone defined by the magnetic field 201, the worker's 301 PAD 401 will only detect the magnetic field 200 and the worker 301 is given a warning.

While the embodiment shown in FIG. 1 includes four silent zones 201, 202, 203, 204, it should be understood that a greater or smaller number of silent zones could be produced. Furthermore, the silent zones could be located in a variety of locations in which a worker or operator would be safer, such as by controls, near non-moving parts, on the equipment, in the driver's seat of the equipment, or other safer locations.

Furthermore, in various embodiments, different silent zones 201, 202, 203, 204 may be activated, either manually or automatically, at different times depending on the status of the equipment 120 and depending on which silent zones are actually safer for a worker to be located in. For example, in one embodiment, when the equipment is stationary, all of the magnetic field generators 201, 202, 203, 204 may be activated to continuously pulse in order to ensure that the silent zones created by magnetic fields 101, 102, 103, 104 are defined. However, when the equipment 120 is moving in reverse, the silent zones defined by the magnetic fields 203 and 204 may be activated while the silent zones defined by the magnetic fields 201 and 202 may be deactivated if those areas are no longer safe.

Depending on which areas are safer for a given operation of the equipment 120, any combination of silent zones may be activated or deactivated based upon the protective needs of the system. The location of the silent zones may also be adjusted by positioning the magnetic field generators 101, 102, 103, 104, or other magnetic field generators not depicted, as necessary near areas to be defined as silent zones. The size of the silent zones may be increased or decreased by adjusting the size of the magnetic fields 201, 202, 203, 204 generated by the magnetic field generators 101, 102, 103, 104 as needed. The size of the magnetic fields 201, 202, 203, 204 generated by the magnetic field generators 101, 102, 103, 104 may be adjusted in numerous ways as described herein. Thus, the silent zones surrounding a piece of equipment 120 may be tailored to fit the needs of both the worksite and the equipment 120.

In one embodiment, a bypass system is integrated with the proximity warning system. The bypass system is connected to the control system of the equipment 120 on which magnetic field generators 100, 101, 102, 103, 104 are mounted. A shown in FIG. 1, for example, the bypass system may be integrated with the controls of a continuous miner 120 and may be a cutter bypass system. The bypass system detects whether the cutter of the continuous miner 120 is operating and turns off the magnetic field generators 100, 101, 102, 103, 104, thereby causing no magnetic fields 200, 201, 202, 203, 204 to be generated, when the continuous miner 120 cutter is operating. This permits a worker 301, 302, 303, 304 to approach the continuous miner 120 during cutting operations without receiving an unnecessary warning from the proximity detection system.

Figure 3:
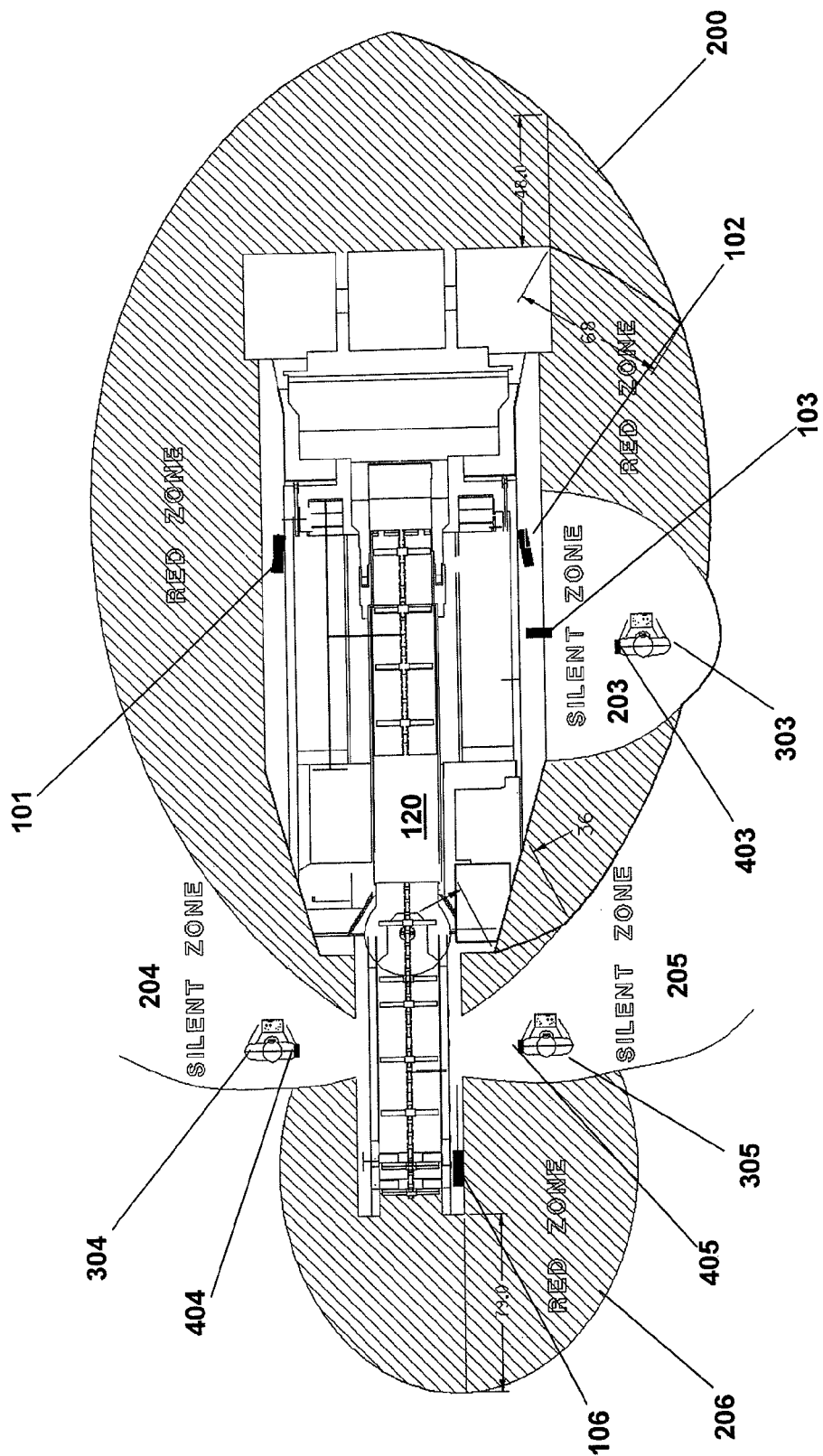
FIG. 3 shows another exemplary embodiment of the proximity warning system which includes multiple magnetic field generators, multiple warning zones, and multiple silent zones.

FIG. 3 shows another exemplary embodiment of the proximity warning system which includes multiple magnetic field generators, multiple warning zones, and multiple silent zones. The warning system of FIG. 3 includes multiple magnetic field generators 101, 102, 103, 106 mounted upon a vehicle 120. In the embodiment of FIG. 3, a first warning zone 200 is the intersection of the magnetic fields generated by two magnetic field generators 101, 102. Therefore, a warning is generated if a PAD detects both the magnetic field generated by magnetic field generator 101 and 102.

A silent zone is defined by a magnetic field 203. Therefore, if a PAD 403 carried by worker 303 detects magnetic fields 200 and 203, the microcontroller determines that the worker 303 is in a silent zone and no alarm is sounded. In the event the PAD 403 only detects magnetic field 200, the worker 303 is determined to be in a warning zone and is issued a warning. The system also includes a second warning zone defined by a magnetic field 206 generated by magnetic field generator 106. A worker carrying a PAD that detects only magnetic field 206 is issued a warning. However, a PAD in the silent zones 204, 205 detects either the presence of both magnetic field 206 and 200 or detects only one magnetic field generated by either magnetic field generator 101 or 102 and is not issued a warning. It should also be understood that no warning is issued when a PAD detects no magnetic fields from any of the magnetic field generators. In various embodiments, other silent zones and warning zones may be defined by the overlap or lack of overlap of various magnetic fields to define silent zones having a variety of different shapes.

Figure 4:
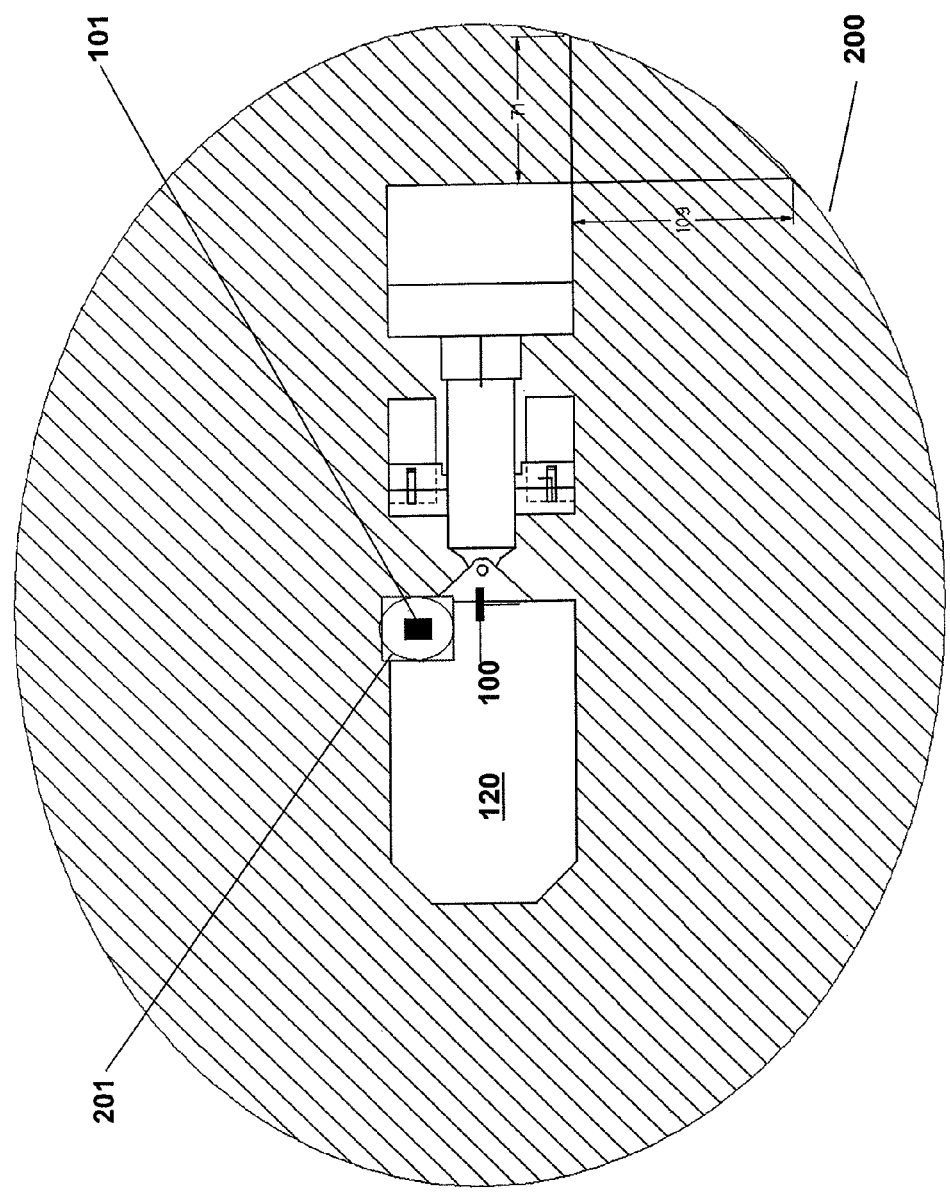
FIG. 4 shows an exemplary worksite having a proximity warning system in accordance with another exemplary embodiment.

Referring now to FIG. 4 there is illustrated a simplified example of a work site where an embodiment is implemented. FIG. 4 shows a proximity warning system that includes a magnetic field generator 100 mounted upon a piece of equipment 120. In various embodiments, the equipment 120 may be mobile or stationary equipment used in mining operations. In the embodiment shown in FIG. 4, for example, the magnetic field generator 100 is mounted on a continuous miner 120. The magnetic field generator 100 generates a magnetic field 200 that surrounds the continuous miner 120 and defines a warning zone. A second magnetic field generator 101 is located within the cab of the continuous miner 120 and generates a magnetic field 201 that envelopes the cab of the continuous miner 120. When a PAD detects only magnetic field 200, a warning is issued. However, when the PAD detects both magnetic field 200 and 201, the worker is determined to be in the silent zone and no warning is issued.

The above description and drawings are only illustrative of preferred embodiments, and are not intended to be limiting. Any subject matter or modification thereof which comes within the spirit and scope of the following claims is to be considered part of the present inventions.

What is claimed as new and desired to be protected by Letters Patent of the United States is:

1. A method for providing a proximity warning comprising:
   generating a plurality of magnetic fields defining a plurality of zones, wherein each of the plurality of magnetic fields at least partially overlaps at least one other of the plurality of magnetic fields, and wherein each of the plurality of zones is defined by a particular combination of the presence or absence of single or multiple magnetic fields of the plurality of magnetic fields, each zone being either a warning zone in which a warning is to be issued or a silent zone in which a warning is not to be issued;
   determining a location of a detector device with respect to the plurality of magnetic fields, wherein the location is determined by detecting at least one of the plurality of magnetic fields using the detector device;
   determining whether a warning is to be issued based on a particular one of the zones in which the detector device is located, wherein it is determined to issue a warning if the detector device is located in a warning zone and it is determined to not issue a warning if the detector device is located in a silent zone; and
   if it is determined to issue a warning, issuing the warning.

2. The method of claim 1, wherein a zone comprising both first and second magnetic fields is a warning zone.

3. The method of claim 1, wherein a zone comprising both first and second magnetic fields is a silent zone.

4. The method of claim 1, wherein a zone comprising only a first magnetic field is a warning zone.

5. The method of claim 1, wherein no warning is issued if the detector device is not located within the plurality of magnetic fields.

6. The method of claim 1, wherein at least one of the plurality of magnetic fields is located completely within another one of the plurality of magnetic fields.

7. The method of claim 1, wherein the warning is issued to a worker who is carrying the detector device.

8. The method of claim 1, wherein the warning is issued to a machine that houses a magnetic field generator for generating the plurality of magnetic fields.

9. The method of claim 8, wherein the warning is issued to an operator of the machine.

10. The method of claim 8, wherein the machine automatically performs certain actions upon receiving the warning.

11. The method of claim 1, wherein the plurality of magnetic fields are low frequency magnetic fields.

12. The method of claim 1, wherein the plurality of zones comprises at least one warning zone and at least one silent zone.

13. The method of claim 12, wherein the at least one silent zone is located completely within the at least one warning zone.

14. The method of claim 12, wherein the plurality of zones further comprises a plurality of silent zones.

15. The method of claim 14, wherein the plurality of zones further comprises a plurality of warning zones.

16. The method of claim 1, wherein determining the location of the detector device comprises using the detector device to measure the strength of each of the plurality of magnetic fields, wherein the presence or absence of each of the plurality of magnetic fields is determined based on the measured strength of the respective magnetic field.

17. The method of claim 1, wherein at least one silent zone is defined by the presence of a magnetic field generated by a single magnetic field generator.

18. A proximity warning system, comprising:
a plurality of generators that generate a plurality of magnetic fields defining a plurality of zones, wherein each of the plurality of magnetic fields at least partially overlaps at least one other of the plurality of magnetic fields, and wherein each of the plurality of zones is defined by a particular combination of the presence or absence of single or multiple magnetic fields of the plurality of magnetic fields, each zone being either a warning zone in which a warning is to be issued or a silent zone in which a warning is not to be issued;
a detector device that measures the strength of each of the plurality of magnetic fields and determines its location with respect to the plurality of magnetic fields; and
an alarm device that issues a warning based on the location of the detector device, wherein the warning is issued if the detector device is located in a warning zone and the warning is not issued if the detector device is located in a silent zone.

19. The system of claim 18, wherein a zone comprising both first and second magnetic fields is a warning zone.

20. The system of claim 18, wherein a zone comprising both first and second magnetic fields is a silent zone.

21. The system of claim 18, wherein a zone comprising only a first magnetic field is a warning zone.

22. The system of claim 18, wherein the alarm device does not issue the warning if the detector device is not located within the plurality of magnetic fields.

23. The system of claim 18, wherein at least one of the plurality of magnetic fields is located completely within another one of the plurality of magnetic fields.

24. The system of claim 18, wherein the detector device and the alarm device are both located in a single device.

25. The system of claim 18, wherein the warning is issued to a worker.

26. The system of claim 25, wherein the warning is issued to an operator of the machine.

27. The system of claim 25, wherein the machine automatically performs certain actions upon receiving the warning.

28. The system of claim 18, wherein the warning is issued to a machine that houses the plurality of generators.

29. The system of claim 18, wherein the plurality of magnetic fields are low frequency magnetic fields.

30. The system of claim 18, wherein the plurality of zones comprises at least one warning zone and at least one silent zone.

31. The system of claim 30, wherein the at least one silent zone is located completely within the at least one warning zone.

32. The system of claim 30, wherein the plurality of zones further comprises a plurality of silent zones.

33. The system of claim 32, wherein the plurality of zones further comprises a plurality of warning zones.

34. The system of claim 18, wherein the presence or absence of each of the plurality of magnetic fields is determined based on the measured strength of the respective magnetic field.

35. The system of claim 18, wherein at least one silent zone is defined by the presence of a magnetic field generated by a single one of the plurality of generators.

* * * * *